Nov. 10, 1959     J. J. KOTTE     2,911,883
FILM PROJECTOR

Filed July 2, 1954

INVENTOR
JAN JACOB KOTTE

BY

AGENT

United States Patent Office 2,911,883
Patented Nov. 10, 1959

2,911,883

FILM PROJECTOR

Jan Jacob Kotte, Eindhoven, Netherlands, assignor, by mesne assignments, to North American Philips Company, Inc., New York, N.Y., a corporation of Delaware Application July 2, 1954, Serial No. 441,066

Claims priority, application Netherlands May 3, 1954

3 Claims. (Cl. 88—17)

The invention relates to film projectors comprising a source of light, a shutter for periodical interception of the beam of light and a film gate consisting of a stationary part and a part adapted to be moved for insertion of the film.

It is already known to arrange the shutter between the light source and the stationary part of the film gate since the film is thus protected from overheating. However, in this arrangement of the shutter the part of the film gate more remote from the light source is designed so as to be adapted to be moved.

It is also already known to design the part of the film gate adjacent the light source so as to be adapted to be moved; in this construction the shutter is arranged between the film gate and the objective.

According to the invention not only the shutter but also the part of the film gate adapted to be moved are arranged between the light source and the stationary part of the film gate.

The said arrangement provides the advantage that during the interception of the light beam the film is not exposed to the heating action of the light source, so that in this arrangement there is no risk of the film being overheated. By arranging the part of the film gate adapted to be moved also at the side of the gate nearer to the source of light the advantage is obtained that the position of the film track and of the objective are completely determined so that satisfactory focussing is maintained even when the the film gate is opened and closed. Preferably the stationary part of the film gate will comprise the stationary film track while the part of the film gate which is adapted to be moved carries the resilient urging elements.

In order to minimize the duration of the period required for alternately shutting off and passing the light beam by means of the shutter, that is to say to restrict the luminous losses produces by the shutter to a minimum, it is essential to arrange the shutter and the film gate in close proximity. In order to allow for this arrangement while the gate must be permitted to be opened in the direction of the shutter the latter comprises only one blade. This blade can be removed from the path of the part of the film gate adapted to be moved by rotation after which the film gate can be opened. It would be very difficult to effect this with a shutter comprising two blades.

The above-described arrangement has a limitation in that opening of the film gate during operation of the apparatus might damage the shutter. In order to prevent the part of the film gate adapted to be moved from being opened during operation of the apparatus, the shutter shaft extends into the path of the part of the film gate adapted to be moved so that this is prevented from opening. However, the film gate is enabled to be opened in that the extension is provided with a recess which only permits of opening the film gate in one position of the shutter shaft. In this position the recess provided in the extension is turned towards the path of the part of the film gate adapted to be moved with the result that the entire extension lies outside of this path. Since there is only one position of the shutter shaft in which the film gate can be opened the high speed at which the shutter revolves during operation of the apparatus prevents the part of the film gate adapted to be moved from being moved past the extension of the shutter shaft in practice. In order to preclude entirely even the theoretical possibility of the film gate being opened during operation of the apparatus the extension comprises a part which is adapted to be moved and which when the projector stands still due to spring action occupies a position such that a recess is provided which permits of opening the film gate, and which fills the recess during operation of the projector under centrifugal force.

Preferably the projector is prevented from being put into operation when the film gate is opened. According to a further feature of the invention this is obtained in that in the open position of the film gate the extension is held in the direction of rotation by the part of the film gate adapted to be moved. In addition, the film gate part adapted to be moved may be coupled to a switch included in the motor circuit so that the motor circuit is at all times interrupted when the film gate is opened.

In order to maintain the shutter in close proximity to the film gate, according to a further feature of the invention a brace secured to the part of the film gate adapted to be moved and embracing the path of the shutter co-operates with the extension of the shutter shaft.

The invention will now be described with reference to the accompanying diagrammatic drawing, in which two embodiments thereof are shown by way of example, and in which.

Figure 1:
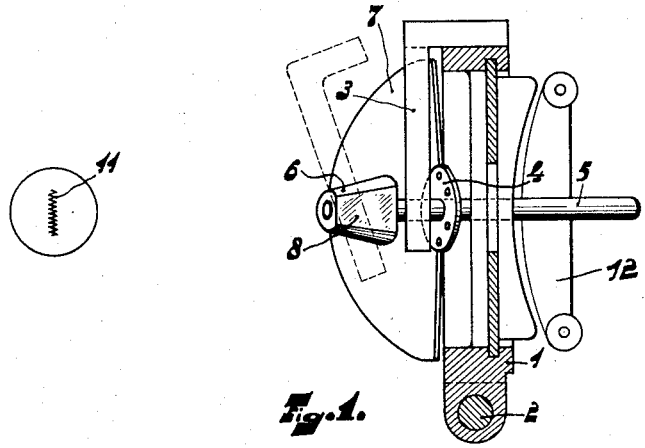
Fig. 1 is a vertical cross-sectional view of the part of the film gate adapted to be moved and the associated shutter, taken at right angles to the optical axis.

Referring now to Fig. 1, a part 1 of a film gate adapted to be moved is pivotally mounted by a shaft 2 and comprises a brace 3 which embraces the path of a shutter 4. The shutter 4 is arranged in close proximity to the film gate 1 and is seated on a shaft 5 which at one end is provided with a thickened part 6. For structural reasons the shutter shaft 5 is not parallel to the optical axis so that the shutter blade 7 is not arranged at right angles to the shutter shaft 5. Hence the thickened part 6 is shaped in the form of a cone. This cone comprises a flattened part 8 with the result that only in the position shown in Fig. 2 the part of the film gate adapted to be moved can be opened. In all other positions of the shutter shaft 5 the film gate is prevented from being opened by the brace 3 striking the thickened part 6.

Figure 2:
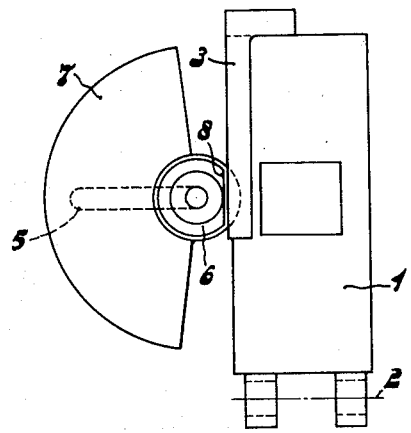
Fig. 2 is a side view in the direction of the optical axis, whilst
Figure 3:
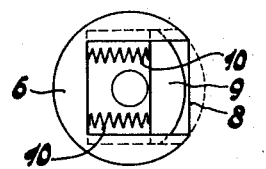
Fig. 3 shows a modification of a construction of the kind shown in Fig. 2.

In the arrangement shown in Fig. 3 the thickened part comprises a part 9 which is adapted to be moved and which under the action of springs 10 releases the flattened part 8 when the projector stands still so that in this event the thickened part is provided with a flattened part 8 similar to that shown in Fig. 2. During operation of the projector the part 9 is pressed outwards under centrifugal force against the action of the springs 10 and thus completes the flattened part 8 to the circular circumference of the thickened part 6 shown in broken lines.

The shutter 4 comprises only a single blade 7 with the result that in a definite position of this blade a sufficient amount of space is available to enable the part 1 of the film gate adapted to be moved to be opened. Consequently the shutter will generally be driven at a speed twice that of a two-bladed shutter. The shutter 4 and the part 1 of the film gate adapted to be moved are arranged between a light source 11 and the stationary part of the film gate 12 as shown in Fig. 1.

What is claimed is:

1. In a motion picture projector a film gate adapted to define a light beam and including a stationary member and a member movable over a predetermined path to permit insertion and removal of a film, a shaft, a shutter mounted on said shaft in close proximity to said film gate for alternately permitting interception and passage of the light beam through said film gate, means mounting said movable member between said stationary member and said shutter, said shutter having an open position in which it is outside the light beam, and means including a part mounted on said shaft to block the path of said movable member except when the shutter is at rest in said open position.

2. A film projector as set forth in claim 1 further comprising said part having a recess and including an element in said recess when said part is at rest, spring means connecting said element to said part whereby upon rotation of said shutter shaft said element moves laterally outwardly in said recess under centrifugal force to a position at least partially out of said recess thereby blocking the path of movement of said film gate movable member.

3. A film projector as set forth in claim 1 wherein in the open position of the film gate movable member said part upon slight movement engages a surface of said film gate movable member to prevent further movement of said part.

References Cited in the file of this patent

UNITED STATES PATENTS

| | | |
|---|---|---|
| 995,061 | Duhem | June 13, 1911 |
| 1,309,471 | Evans | July 8, 1919 |
| 1,485,908 | Brown | Mar. 4, 1924 |
| 1,725,944 | Thompson | Aug. 27, 1929 |
| 1,825,253 | Victor | Sept. 29, 1931 |
| 1,835,493 | Howell | Dec. 8, 1931 |
| 2,186,618 | Philips | Jan. 9, 1940 |